United States Patent
Fox et al.

(10) Patent No.: US 7,807,591 B2
(45) Date of Patent: Oct. 5, 2010

(54) FIBROUS WEB COMPRISING MICROFIBERS DISPERSED AMONG BONDED MELTSPUN FIBERS

(75) Inventors: Andrew R. Fox, Oakdale, MN (US); John D. Stelter, St. Joseph Township, WI (US); Timothy J. Lindquist, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 112 days.

(21) Appl. No.: 11/461,192

(22) Filed: Jul. 31, 2006

(65) Prior Publication Data

US 2008/0026661 A1     Jan. 31, 2008

(51) Int. Cl.
*D04H 1/00*     (2006.01)
*D04H 13/00*    (2006.01)
*D04H 5/00*     (2006.01)

(52) U.S. Cl. .................. 442/344; 442/350; 442/351; 442/400; 442/401; 442/409

(58) Field of Classification Search ................ 442/344, 442/350, 351, 400, 401, 409
See application file for complete search history.

(56) References Cited

U.S. PATENT DOCUMENTS

| | | | |
|---|---|---|---|
| 3,874,886 A | 4/1975 | Levecque et al. | |
| 4,100,324 A | 7/1978 | Anderson et al. | |
| 4,118,531 A | 10/1978 | Hauser | |
| 4,286,977 A | 9/1981 | Klein | |
| 4,363,646 A | 12/1982 | Torobin | |
| 4,405,297 A | 9/1983 | Appel et al. | 425/72 |
| 4,910,064 A | 3/1990 | Sabee | |
| 4,931,355 A * | 6/1990 | Radwanski et al. | 442/344 |
| 5,079,080 A | 1/1992 | Schwarz | 428/288 |
| 5,200,246 A | 4/1993 | Sabee | |

(Continued)

FOREIGN PATENT DOCUMENTS

EP     0 799 342     10/1997

(Continued)

OTHER PUBLICATIONS

Fiber Motion Near The Collector During Melt Blowing: Part 2-Fly Formation; R. Bresee, 2002, 21-27.

(Continued)

*Primary Examiner*—Norca L Torres-Velazquez
(74) *Attorney, Agent, or Firm*—Roger R. Tamte; James A. Baker

(57) ABSTRACT

A nonwoven fibrous web comprising a matrix of continuous meltspun fibers bonded to a coherent self-sustaining form, and separately prepared microfibers dispersed among the meltspun fibers. The microfibers may have median diameters less than one or two micrometers. A method for preparing such a nonwoven fibrous web comprises establishing a stream of continuous oriented meltspun fibers having a longitudinal axis, establishing a stream of meltblown microfibers that exit a meltblowing die at a point near the stream of meltspun fibers, the meltblown stream being aimed to merge with the meltspun stream and having a longitudinal axis that forms an angle of between 0 and 90 degrees to the longitudinal axis of the meltspun stream, capturing the meltblown fibers in the stream of meltspun fibers, and collecting the merged stream as a web on a collector spaced near the intersection point of the meltspun and meltblown streams.

21 Claims, 7 Drawing Sheets

U.S. PATENT DOCUMENTS

| | | | |
|---|---|---|---|
| 5,227,107 A | 7/1993 | Dickenson et al. | |
| 5,409,768 A | 4/1995 | Dickenson et al. | |
| 5,496,507 A | 3/1996 | Angadjivand et al. | |
| 5,681,469 A | 10/1997 | Barboza et al. | 210/503 |
| 5,685,757 A * | 11/1997 | Kirsch et al. | 442/344 |
| 5,993,943 A | 11/1999 | Bodaghi et al. | |
| 6,274,238 B1 | 8/2001 | DeLucia | 428/373 |
| 6,315,806 B1 | 11/2001 | Torobin et al. | 55/522 |
| 6,607,624 B2 | 8/2003 | Berrigan et al. | |
| 6,667,254 B1 | 12/2003 | Thompson, Jr. et al. | |
| 6,743,273 B2 | 6/2004 | Chung et al. | |
| 6,800,226 B1 | 10/2004 | Gerking | |
| 6,827,764 B2 * | 12/2004 | Springett et al. | 442/344 |
| 6,893,711 B2 | 5/2005 | Williamson et al. | |
| 2003/0114066 A1 | 6/2003 | Clark et al. | 442/361 |
| 2004/0035095 A1 | 2/2004 | Healey | |

FOREIGN PATENT DOCUMENTS

| | | |
|---|---|---|
| JP | 2007-54778 | 3/2007 |
| WO | WO 02/46504 | 6/2002 |
| WO | WO 2004/046443 | 3/2004 |
| WO | WO 2004/011123 | 5/2004 |
| WO | WO 2007/112877 | 10/2007 |

OTHER PUBLICATIONS

Industrial Engineering Chemistry, vol. 48, p. 1342 et ewq (1956); Wente, Van A. "Superfine Thermoplastic Fibers".

Report No. 4364 of the Naval Research Laboratories, May 25, 1954, entitled Manufacture of Superfine Organic Fibers, Wente, V.A.; Boone, C.D.; and Fluharty, E.L.

Pending U.S. Appl. No. 11/457,899, filed Jul. 17, 2006.

* cited by examiner

FIBROUS WEB COMPRISING MICROFIBERS DISPERSED AMONG BONDED MELTSPUN FIBERS

FIELD OF THE INVENTION

The present invention relates to nonwoven fibrous webs comprising a combination of continuous oriented meltspun fibers and separately prepared microfibers.

BACKGROUND OF THE INVENTION

Nonwoven fibrous webs used as filtration media often comprise two or more kinds of fibers, each having a different average diameter so the web can filter particles of a broad range of sizes. Generally the different kinds of fibers lie in different layers of the web. One example taught in Healy, U.S. Patent Application Publication No. US 2004/0035095, is a filtration web comprising a layer of microfibers having diameters between about 0.8 and 1.5 micrometers meltblown onto a spunbond web. A problem with such a web is that such small microfibers, exposed on the top of the web, are very fragile and easily crushed by normal handling or contact with some object. Also, with very fine diameter fibers it can be difficult, because of the very low weight of an individual fiber, to transport the fibers and retain them in an efficient fiber stream. Some of the very fine fibers tend to scatter as they issue from a meltblowing die rather than travel as a contained stream to a collector.

Another example of prior-art multilayer, multidiameter fibrous webs is so-called SMS webs, comprising a layer of spunbond fibers, a layer of meltblown microfibers, and another layer of spunbond fibers. The multilayer nature of such webs increases their thickness and weight, and also introduces some complexity in manufacture.

SUMMARY OF THE INVENTION

By the present invention microfibers are incorporated into a nonwoven fibrous web that comprises a coherent matrix of meltspun fibers. It has been found that a stream of microfibers, including a stream consisting only of very fine microfibers having a median diameter of one or two micrometers or less, can be merged with a stream of meltspun fibers, whereupon the microfibers are captured by the stream of meltspun fibers and dispersed among the meltspun fibers. Also, by the present invention the collected meltspun fibers are bonded, preferably by an autogenous thermal bonding step, to form a coherent matrix that is self-sustaining in which the microfibers are reliably held and protected so the web can be handled and used with minimal loss or crushing of microfibers. Preferably the meltspun fibers are oriented fibers comprised of a semicrystalline polymeric material, thus adding to the mechanical or physical properties of the web.

In brief summary, the present invention provides a nonwoven fibrous web that comprises a matrix of continuous meltspun fibers bonded to a coherent self-sustaining form, and separately prepared microfibers dispersed among the meltspun fibers, most often in an amount accounting for at least one weight-percent of the fibers of the web.

A web as described has a number of beneficial and unique properties. For example, a useful finished product can be prepared that consists only of a single layer, but comprises a mixture of microfibers and larger fibers, with broadened filtration capability and increased fiber surface area. Such a single-layer product offers important efficiencies—product complexity and waste are reduced by eliminating laminating processes and equipment and by reducing the number of intermediate materials. Given the direct-web-formation nature of manufacturing webs of the invention, in which a fiber-forming polymeric material is converted into a web in one essentially direct operation, webs of the invention can be quite economical. Also, if the fibers of the web all comprise the same polymeric composition, the web can be fully recyclable.

A web of the invention, including single-layer products, can be used in a variety of forms—e.g., it can be molded or pleated, as well as being used in its collected form. By using microfibers of very small diameter, which is made possible by the invention, the web is given an even more greatly increased fiber surface area, with such beneficial effects as improved filtration and thermal or acoustic insulating performance. Performance such as filtration and insulation performance can be tailored to a particular use by using fibers of different diameters. And in contrast to the high pressure drop often characteristic of microfiber webs, pressure drops of webs of the invention are kept lower, because the larger meltspun fibers physically separate and space apart the microfibers.

Glossary

For purposes herein, "microfibers" are regarded as fibers having a median diameter of 10 micrometers or less; "ultrafine microfibers" are regarded as microfibers having a median diameter of two micrometers or less; and "submicron microfibers" are regarded as microfibers having a median diameter one micrometer or less. When reference is made herein to a batch, group, array, etc. of a particular kind of microfiber, e.g., "an array of submicron microfibers," it means the complete population of microfibers in that array, or the complete population of a single batch of microfibers, and not only that portion of the array or batch that is of submicron dimensions.

"Continuous oriented meltspun fibers" herein refers to essentially continuous fibers issuing from a die and traveling through a processing station in which the fibers are permanently drawn and at least portions of the polymer molecules within the fibers are permanently oriented into alignment with the longitudinal axis of the fibers ("oriented" as used with respect to fibers means that at least portions of the polymer molecules of the fibers are aligned along the longitudinal axis of the fibers). "Meltblown fibers" herein refers to fibers prepared by extruding molten fiber-forming material through orifices in a die into a high-velocity gaseous stream, where the extruded material is first attenuated and then solidifies as a mass of fibers. "Separately prepared microfibers" means a stream of microfibers produced from a microfiber-forming apparatus (e.g., a die) positioned such that the microfiber stream is initially spatially separate (e.g., over a distance of about 1 inch (25 mm) or more from, but will merge in flight and disperse into, a stream of larger size fibers.

"Autogenous bonding" is defined as bonding between fibers at an elevated temperature as obtained in an oven or with a through-air bonder without application of solid contact pressure such as in point-bonding or calendering.

"Molecularly same" polymer refers to polymers that have essentially the same repeating molecular unit, but which may differ in molecular weight, method of manufacture, commercial form, etc.

"Self supporting" or "self sustaining" in describing a web means that the web can be held, handled and processed by itself.

Other Prior Art

The prior art is replete with teachings of a stream of one kind of fiber being mixed with another stream of fibers and collected as a combination web. One such example is Radwanski et al, U.S. Pat. No. 4,931,355, which teaches a composite web formed by introducing a secondary stream of "pulp fibers, staple fibers, meltblown fibers and continuous filaments" (Abstract) into a primary stream of meltblown fibers, and then hydroentangling the deposited admixture. The use of meltblown fibers is said to facilitate hydroentangling and avoids other bonding techniques (column 4, lines 16-20). The secondary stream is preferably of lower velocity than the primary stream (column 7, lines 46-50). All the fibers of the web are said to be unoriented to give good isotropic properties (column 13, lines 47-49). There is no teaching of a web comprising a coherent matrix of continuous oriented thermally bonded meltspun fibers, with microfibers dispersed among the meltspun fibers.

Bodaghi et al, U.S. Pat. No. 5,993,943 teaches small-diameter oriented meltblown fibers, including fibers that can average less than one micrometer (micron) in diameter) to which non-oriented meltblown fibers may be added; but there is no teaching of a coherent matrix of bonded meltspun fibers in which meltblown microfibers are dispersed.

Springett, WO 2004/011123, teaches a filter element that comprises a porous molded web that contains thermally bonded staple fibers and non-thermally bonded electrically charged microfibers, the porous molded web being retained in its molded configuration, at least in part, by bonds between the staple fibers at points of fiber intersection.

DETAILED DESCRIPTION

Figure 1:
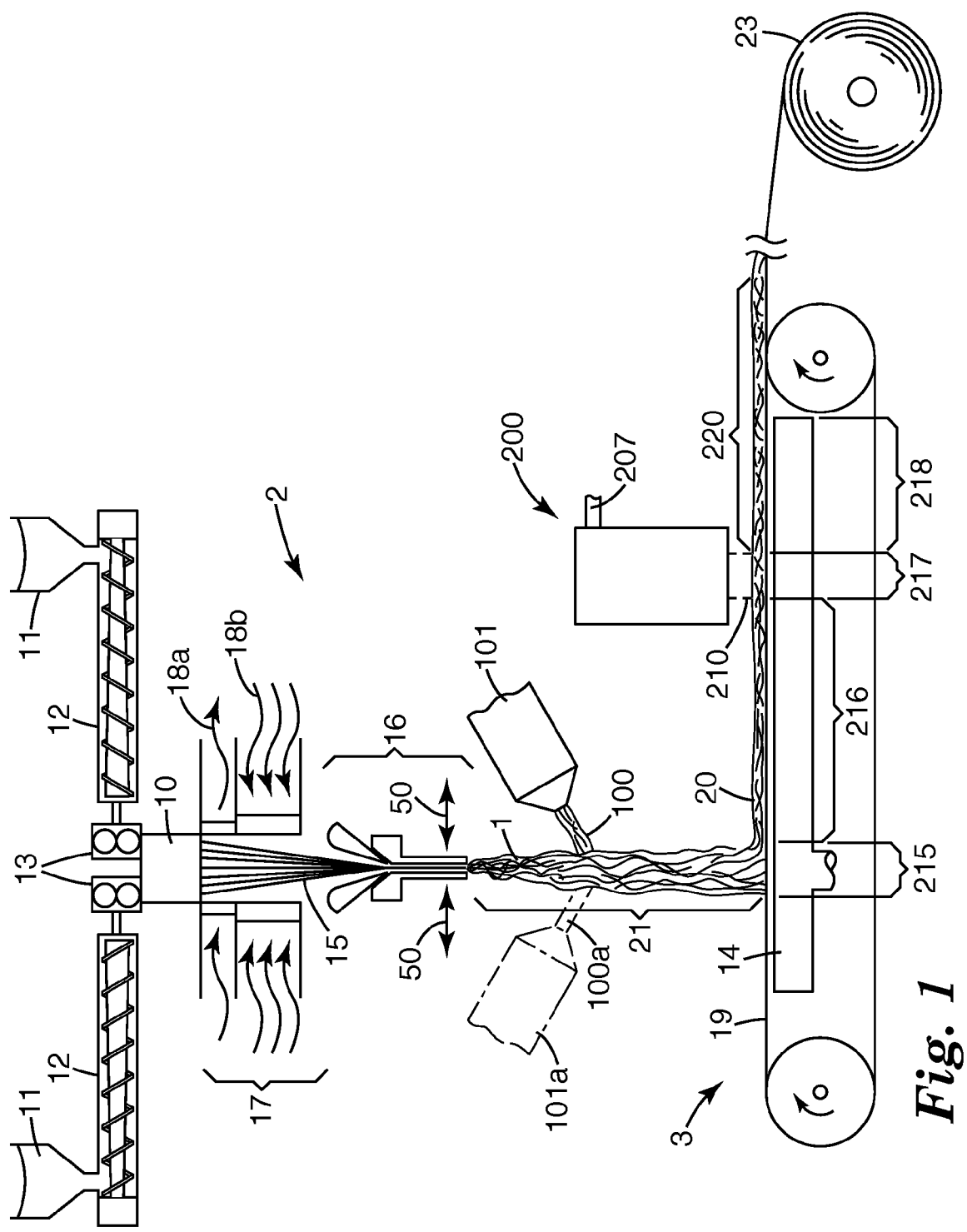
FIG. 1 is a schematic overall diagram of apparatus of the invention for forming a nonwoven fibrous web according to the invention.
Figure 2:
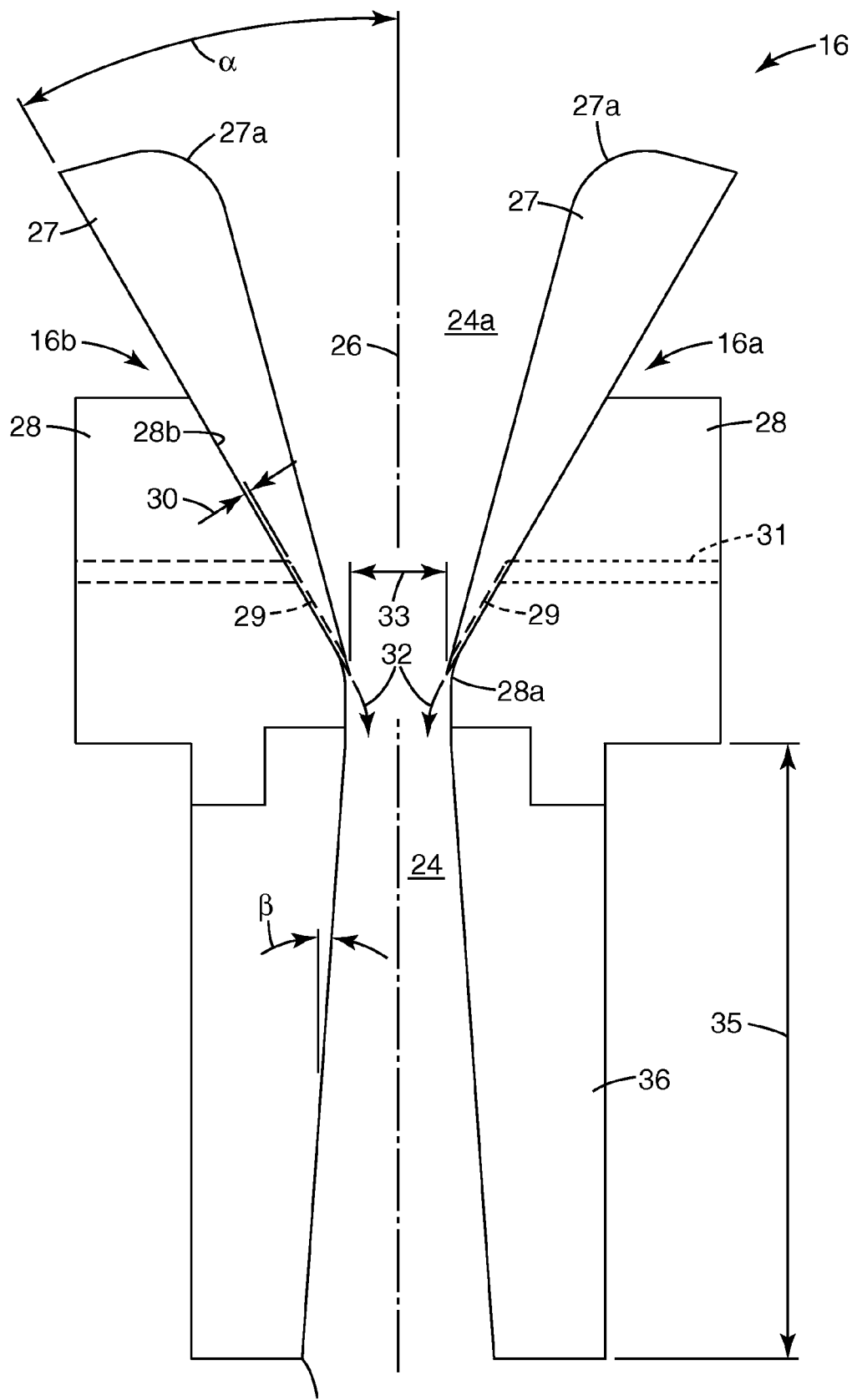
FIG. 2 is an enlarged side view of a processing chamber for preparing fibers useful in a web of the invention, with mounting means for the chamber not shown.
Figure 3:
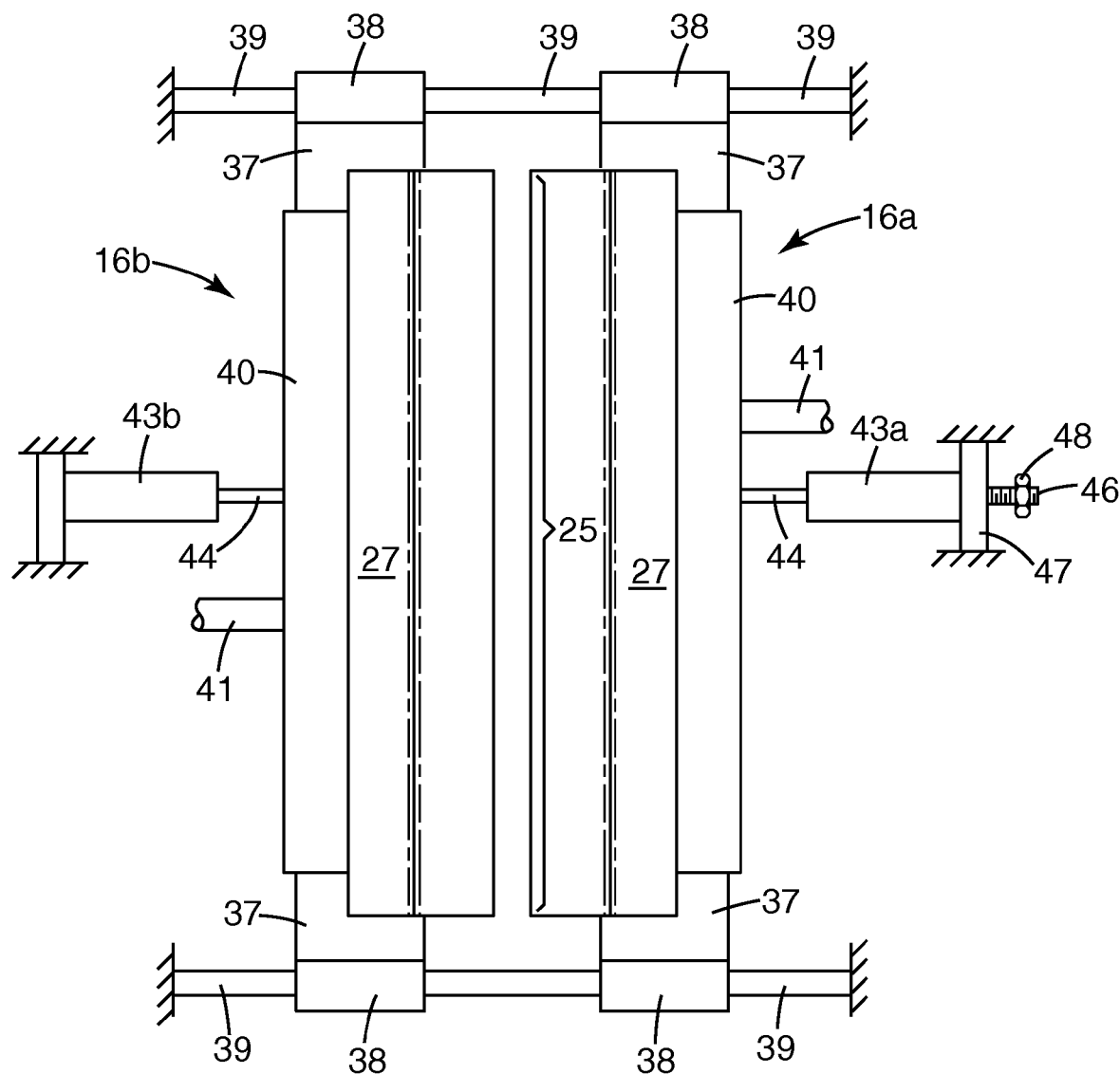
FIG. 3 is a top view, partially schematic, of the processing chamber shown in FIG. 2 together with mounting and other associated apparatus.
Figure 4:
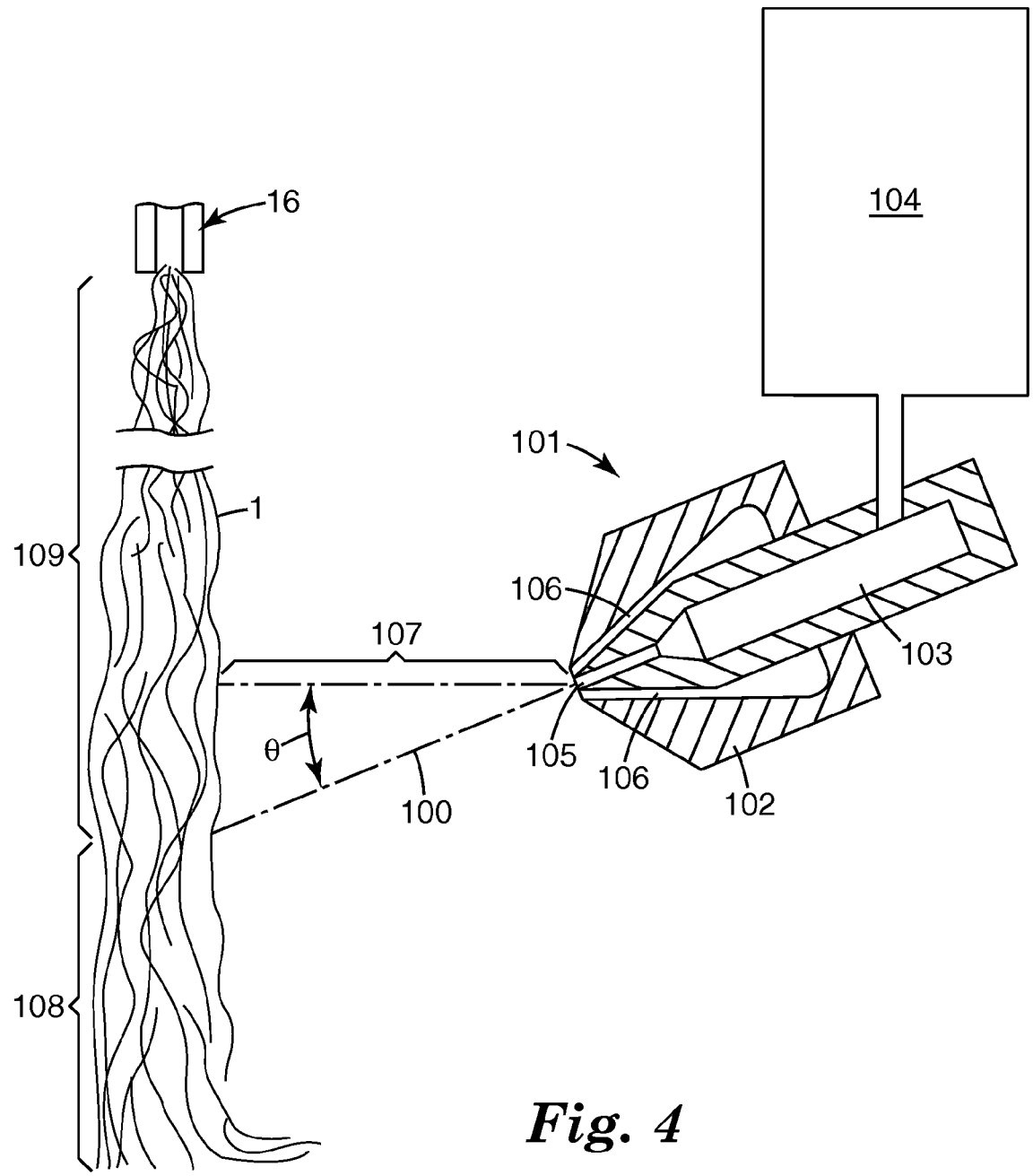
FIG. 4 is an enlarged view of a portion of the apparatus shown in FIG. 1.
Figure 5:
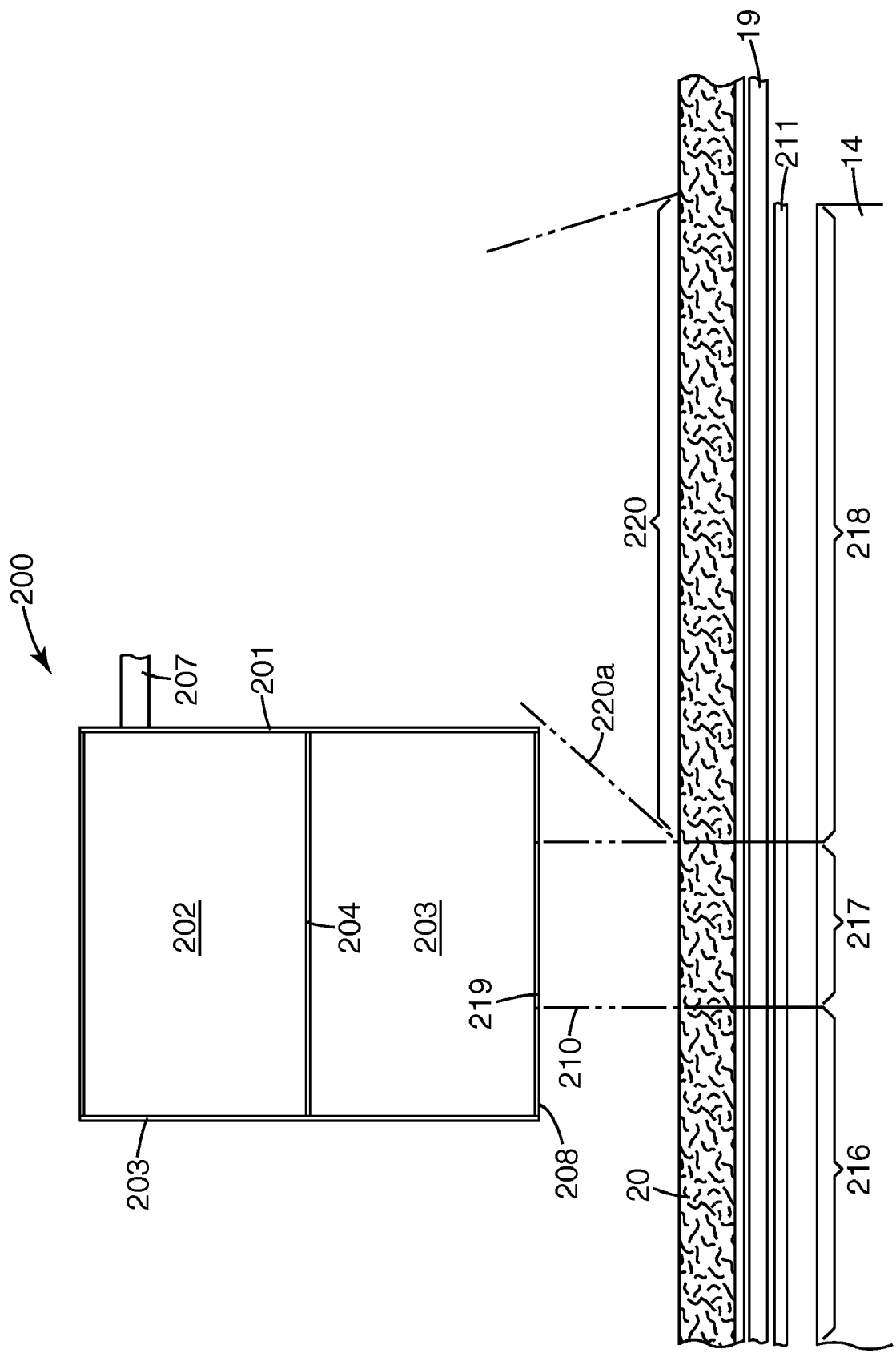
FIG. 5 is a schematic enlarged and expanded view of a heat-treating part of the apparatus shown in FIG. 1.
Figure 6:
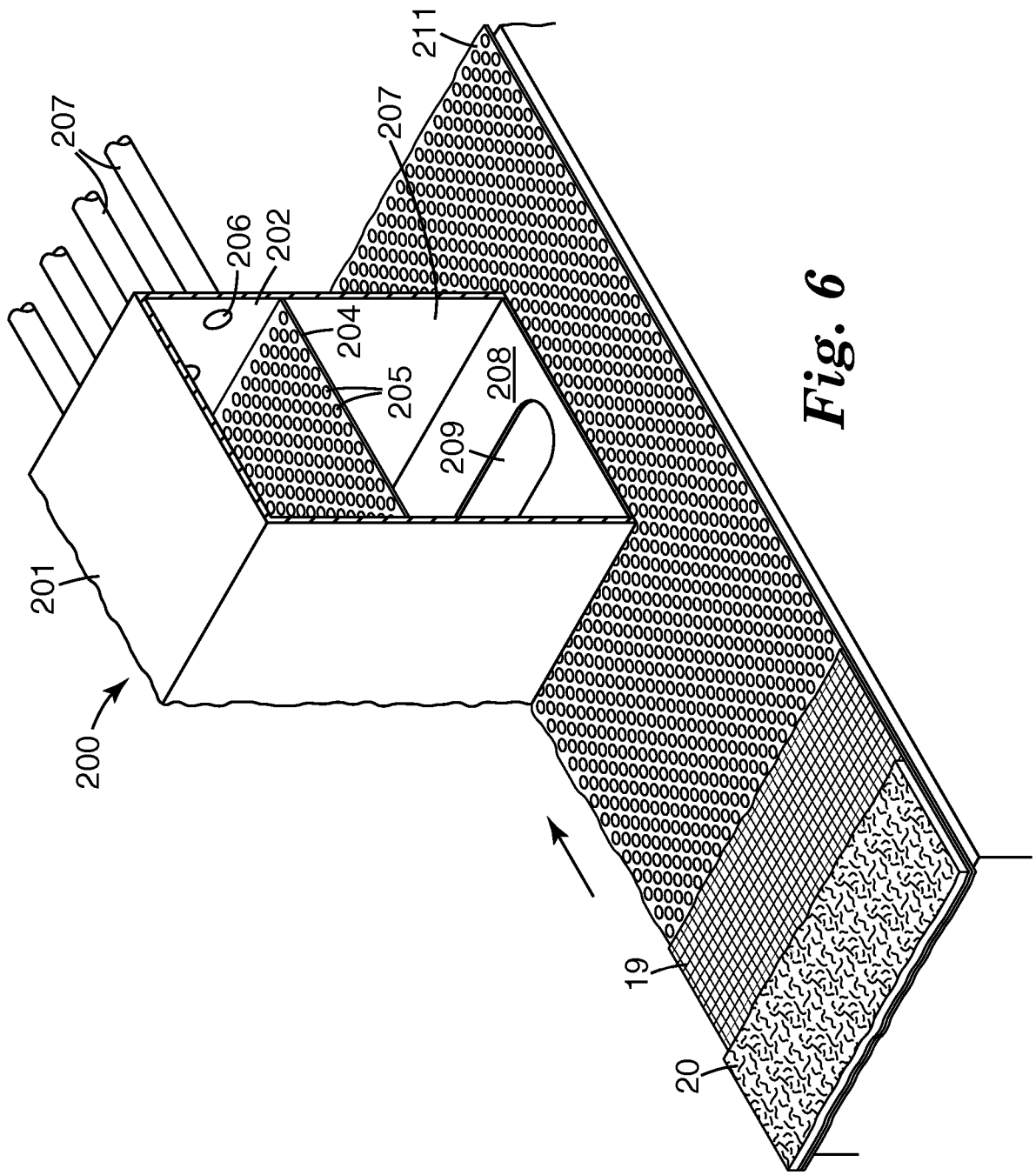
FIG. 6 is a perspective view of the apparatus of FIG. 5.

FIGS. 1-6 show an illustrative apparatus for carrying out the invention as part of a direct-web production method and apparatus. FIG. 1 is a schematic overall side view; FIGS. 2 and 3 are enlarged views of fiber-forming portions of the FIG. 1 apparatus; FIGS. 4 and 5 are enlarged views of other portions of the apparatus shown in FIG. 1; and FIG. 6 is a perspective view of apparatus as shown in FIGS. 1 and 5.

As generally illustrated in FIG. 1, a stream 1 of continuous oriented meltspun fibers is prepared in fiber-forming apparatus 2 and directed toward collection apparatus 3. On its course between the fiber-forming apparatus 2 and the collection apparatus 3, the stream 1 is intercepted by a stream 100 of meltblown fibers emanating from meltblowing apparatus 101. The two streams merge as discussed in more detail below and become deposited on the collection apparatus as a blended web of the oriented continuous meltspun fibers and the meltblown fibers. If desired, a second meltblowing apparatus 101a could be used to introduce meltblown fibers on both sides of the meltspun stream.

The fiber-forming apparatus 2 in FIG. 1 is a preferred apparatus for use in the invention. In using this apparatus, fiber-forming material is brought to an extrusion head 10—in this illustrative apparatus, by introducing a polymeric fiber-forming material into a hopper 11, melting the material in an extruder 12, and pumping the molten material into the extrusion head 10 through a pump 13. Although solid polymeric material in pellet or other particulate form is most commonly used and melted to a liquid, pumpable state, other fiber-forming liquids such as polymer solutions can also be used.

The extrusion head 10 may be a conventional spinnerette or spin pack, generally including multiple orifices arranged in a regular pattern, e.g., straightline rows. Filaments 15 of fiber-forming liquid are extruded from the extrusion head and conveyed to a processing chamber or attenuator 16. The distance 17 the extruded filaments 15 travel before reaching the attenuator 16 can vary, as can the conditions to which they are exposed. Typically, quenching streams 18 of air or other gas are presented to the extruded filaments to reduce the temperature of the extruded filaments 15. Alternatively, the streams of air or other gas may be heated to facilitate drawing of the fibers. There may be one or more streams of air or other fluid—e.g., a first air stream 18a blown transversely to the filament stream, which may remove undesired gaseous materials or fumes released during extrusion; and a second quenching air stream 18b that achieves a major desired temperature reduction. Or even more quenching streams may be used; for example, the stream shown as 18b in FIG. 1 could itself comprise more than one stream to achieve a desired level of quenching. Depending on the process being used or the form of finished product desired, the quenching air may be sufficient to solidify the extruded filaments 15 before they reach the attenuator 16. In other cases the extruded filaments are still in a softened or molten condition when they enter the attenuator. Alternatively, no quenching streams are used; in such a case ambient air or other fluid between the extrusion head 10 and the attenuator 16 may be a medium for any change in the extruded filaments before they enter the attenuator.

The filaments 15 pass through the attenuator 16, and eventually exit onto a collector 19 where they are collected as a mass of fibers 20, as discussed in more detail below. The collector 19 is generally porous and a gas-withdrawal device 14 can be positioned below the collector to assist deposition of fibers onto the collector. The distance 21 between the attenuator exit and the collector may be varied to obtain different effects.

In the attenuator the filaments are lengthened and reduced in diameter and polymer molecules in the filaments become oriented, i.e., at least portions of the polymer molecules within the fibers become aligned with the longitudinal axis of the fibers. In the case of semicrystalline polymers, the orientation is generally sufficient to develop strain-induced crystallinity, which greatly strengthens the resulting fibers. FIG. 2 is an enlarged side view of a representative attenuator 16 for preparing meltspun fibers that are especially useful in webs of the invention. The attenuator 16 comprises two movable halves or sides 16a and 16b separated so as to define between them the processing chamber 24: the facing surfaces of the sides 16a and 16b form the walls of the chamber. FIG. 3 is a top and somewhat schematic view at a different scale showing the representative attenuator 16 and some of its mounting and support structure. As seen from the top view in FIG. 3, the processing or attenuation chamber 24 is generally an elongated slot, having a transverse length 25 (transverse to the path of travel of filaments through the attenuator).

Although existing as two halves or sides, the attenuator functions as one unitary device and will be first discussed in its combined form. (The structure shown in FIGS. 2 and 3 is representative only, and a variety of different constructions may be used.) The representative attenuator 16 includes slanted entry walls 27, which define an entrance space or throat 24a of the attenuation chamber 24. The entry walls 27 preferably are curved at the entry edge or surface 27a to smooth the entry of air streams carrying the extruded filaments 15. The walls 27 are attached to a main body portion 28, and may be provided with a recessed area 29 to establish a gap 30 between the body portion 28 and wall 27. Air may be introduced into the gaps 30 through conduits 31, creating air knives (represented by the arrows 32) that increase the velocity of the filaments traveling through the attenuator, and that also have a further quenching effect on the filaments. The attenuator body 28 is preferably curved at 28a to smooth the passage of air from the air knife 32 into the passage 24. The angle ($\alpha$) of the surface 28b of the attenuator body can be selected to determine the desired angle at which the air knife impacts a stream of filaments passing through the attenuator. Instead of being near the entry to the chamber, the air knives may be disposed further within the chamber.

The attenuation chamber 24 may have a uniform gap width (the horizontal distance 33 on the page of FIG. 2 between the two attenuator sides is herein called the gap width) over its longitudinal length through the attenuator (the dimension along a longitudinal axis 26 through the attenuation chamber is called the axial length). Alternatively, as illustrated in FIG. 2, the gap width may vary along the length of the attenuator chamber. In a different embodiment, the attenuation chamber is defined by straight or flat walls; in such embodiments the spacing between the walls may be constant over their length, or alternatively the walls may slightly diverge or converge (preferred because it tends to cause a widening of the meltspun fiber stream) over the axial length of the attenuation chamber. In all these cases, the walls defining the attenuation chamber are regarded as parallel herein, because the deviation from exact parallelism is relatively slight. As illustrated in FIG. 2, the walls defining the main portion of the longitudinal length of the passage 24 may take the form of plates 36 that are separate from, and attached to, the main body portion 28.

The length of the attenuation chamber 24 can be varied to achieve different effects; variation is especially useful with the portion between the air knives 32 and the exit opening 34, sometimes called herein the chute length 35. The angle between the chamber walls and the axis 26 may be wider near the exit 34 to change the distribution of fibers onto the collector; or structure such as deflector surfaces, Coanda curved surfaces, and uneven wall lengths may be used at the exit to achieve a desired spreading or other distribution of fibers. In general, the gap width, chute length, attenuation chamber shape, etc. are chosen in conjunction with the material being processed and the mode of treatment desired to achieve desired effects. For example, longer chute lengths may be useful to increase the crystallinity of prepared fibers. Conditions are chosen and can be widely varied to process the extruded filaments into a desired fiber form.

As illustrated in FIG. 3, the two sides 16a and 16b of the representative attenuator 16 are each supported through mounting blocks 37 attached to linear bearings 38 that slide on rods 39. The bearing 38 has a low-friction travel on the rod through means such as axially extending rows of ball-bearings disposed radially around the rod, whereby the sides 16a and 16b can readily move toward and away from one another. The mounting blocks 37 are attached to the attenuator body 28 and a housing 40 through which air from a supply pipe 41 is distributed to the conduits 31 and air knives 32.

In this illustrative embodiment, air cylinders 43a and 43b are connected, respectively, to the attenuator sides 16a and 16b through connecting rods 44 and apply a clamping force pressing the attenuator sides 16a and 16b toward one another. Some useful modes of operation of the attenuator 16 are described in Berrigan et al., U.S. Pat. No. 6,607,624, incorporated herein by reference. For example, movement of the attenuator sides or chamber walls may occur when there is a perturbation of the system, such as when a filament being processed breaks or tangles with another filament or fiber.

As will be seen, in the attenuator 16 illustrated in FIGS. 2 and 3, there are no side walls at the ends of the transverse length of the chamber. The result is that fibers passing through the chamber can spread outwardly outside the chamber as they approach the exit of the chamber. Such a spreading can be desirable to widen the mass of fibers collected on the collector. In other embodiments, the processing chamber does include side walls, though a single side wall at one transverse end of the chamber is not attached to both chamber sides 16a and 16b, because attachment to both chamber sides would prevent separation of the sides as discussed above. Instead, a sidewall(s) may be attached to one chamber side and move with that side when and if it moves in response to changes of pressure within the passage. In other embodiments, the side walls are divided, with one portion attached to one chamber side, and the other portion attached to the other chamber side, with the sidewall portions preferably overlapping if it is desired to confine the stream of processed fibers within the processing chamber.

Although the apparatus shown in FIGS. 1-3 with movable walls has advantages as described, use of such an attenuator is not necessary to practice of the present invention. Fibers useful in the invention may be prepared on apparatus in which the walls of the attenuator are fixed and unmovable, or do not move in practice.

Generally, any fiber-forming polymeric material may be used in preparing the meltspun fiber, though usually and preferably the fiber-forming material is semicrystalline. The polymers commonly used in fiber formation such as polyethylene, polypropylene, polyethylene terephthalate, nylon, and urethanes, are especially useful. Webs of the invention have also been prepared from amorphous polymers such as polystyrene. The specific polymers listed here are examples only, and a wide variety of other polymeric or fiber-forming materials are useful.

Fibers also may be formed from blends of materials, including materials into which certain additives have been blended, such as pigments or dyes. Bicomponent meltspun fibers, such as core-sheath or side-by-side bicomponent fibers, may be prepared ("bicomponent" herein includes fibers with two or more components, each component occupying a part of the cross-sectional area of the fiber and extending over a substantial length of the fiber), as may be bicomponent meltblown microfibers. However, the invention is particularly useful and advantageous with monocomponent fibers (in which the fibers have essentially the same composition across their cross-section, but "monocomponent"

includes blends or additive-containing materials, in which a continuous phase of uniform composition extends across the cross-section and over the length of the fiber). Among other benefits, the ability to use single-component fibers reduces complexity of manufacturing and places fewer limitations on use of the web.

Various processes conventionally used as adjuncts to fiber-forming processes may be used in connection with filaments as they enter or exit from the attenuator, such as spraying of finishes or other materials onto the filaments, application of an electrostatic charge to the filaments, application of water mists, etc. In addition, various materials may be added to a collected web, including bonding agents, adhesives, finishes, and other webs or films.

The meltblowing apparatus 101 can be of known structure and operated in known ways to produce meltblown microfibers for use in the invention. An early description of the basic meltblowing method and apparatus is found in Wente, Van A. "Superfine Thermoplastic Fibers," in Industrial Engineering Chemistry, Vol. 48, pages 1342 et seq (1956), or in Report No. 4364 of the Naval Research Laboratories, published May 25, 1954, entitled "Manufacture of Superfine Organic Fibers" by Wente, V. A.; Boone, C. D.; and Fluharty, E. L. The typical meltblowing apparatus includes a die 102 which has an extrusion chamber 103 through which liquefied fiber-forming material is advanced from an extruder 104; die orifices 105 arranged in line across the forward end of the die and through which the fiber-forming material is extruded; and cooperating gas orifices 106 through which a gas, typically heated air, is forced at very high velocity. The high-velocity gaseous stream draws out and attenuates the extruded fiber-forming material, whereupon the fiber-forming material solidifies (to varying degrees of solidity) and forms a stream of microfibers 100 during travel to its point of merger with the meltspun stream 1.

Methods for meltblowing microfibers of very small diameter including submicron sizes are known; see, for example, Bodaghi et al, U.S. Pat. No. 5,993,943, e.g., at column 8, line 11 through column 9, line 25; but passage of filaments through an orienting chamber as described by Bodaghi et al. is not necessary to obtain small-diameter microfibers for use in this invention.

Polypropylene is generally the preferred material for forming meltblown fibers, but many other materials can be used, including generally any of the materials useful for forming the meltspun fibers. It is usually preferred in the case of webs that are to be electrically charged that both the meltspun fibers and the meltblown fibers be made of an electrically chargeable material. Preferred materials include polypropylene, polycarbonate, polymethyl pentene, and copolymers of cyclic olefins; others are polyethylene and polylactic acid polymers.

The meltblowing die 102 is preferably positioned near the stream 1 of meltspun fibers to best achieve capture of the meltblown fibers by the meltspun fibers; close placement of the meltblowing die to the meltspun stream is especially important for capture of submicron-size fibers. For example, the distance 107 in FIG. 4, from the exit of the die 102 to the centerline of the meltspun stream 1 is preferably about 2 to 12 inches (5 to 25 centimeters) and preferably about 6 or 8 inches (about 15 or 20 centimeters) or less for very small microfibers Also, the stream 100 of meltblown fibers is preferably disposed at an acute angle θ to the stream 1 of meltspun fibers, so that a vector of the meltblown stream 100 is directionally aligned with the stream 1. Preferably, θ is between about 0 and 45 degrees and preferably between 10 and 30 degrees. The distance 108 from the approximate point of joinder of the meltblown and meltspun streams to the collector 19 is typically at least 10 but less than 40 centimeters to avoid over-entangling and to retain web uniformity. The distance 109 is sufficient, generally at least 6 inches (about 15 centimeters), for the momentum of the meltspun stream to be reduced and thereby allow the meltblown stream to better merge with the meltspun stream.

Other techniques to form submicron fibers can also be used, for example, as taught in U.S. Pat. Nos. 5,227,107, 6,743,273, 6,800,226, Torobin, U.S. Pat. Nos. 4,363,646, and 3,874,886.

Meltblown fibers are typically very long, though they are generally regarded as discontinuous. Their long lengths—with a length-to-diameter ratio approaching infinity in contrast to the finite lengths of staple fibers—causes them to be better held within the matrix of meltspun fibers. They are usually organic and polymeric and often of the molecularly same polymer as the meltspun fibers. As the streams of meltblown and meltspun fibers merge, the meltblown fibers become dispersed among the meltspun fibers. A rather uniform mixture is obtained, especially in the x-y dimensions, with the distribution in the z dimension being controlled by particular process steps such as control of the distance 107, the angle θ, and the mass and velocity of the merging streams. The merged stream continues to the collector 19 in FIG. 1 and there is collected as a web-like mass 20.

The amount of microfibers included in a web of the invention can be varied depending on the intended use of the web. An effective amount, i.e., an amount effective to accomplish desired performance, need not be large in weight amount. Usually the microfibers account for at least one weight percent and less than about 50 weight percent of the fibers of the web. Because of the high surface area of the microfibers, a small weight amount may accomplish desired performance. In the case of webs of the invention that include very small microfibers, the microfibers generally account for at least 5 percent of the fibrous surface area of the web, and more typically 10 or 20 percent or more of the fibrous surface area. A particular advantage of the invention is the ability to present small-diameter fibers to a needed application such as filtration or thermal or acoustic insulation.

Depending on the condition of the meltspun and meltblown fibers, some bonding may occur between the fibers during collection. However, further bonding between the meltspun fibers in the collected web is usually needed to provide a matrix of desired coherency, making the web more handleable and better able to hold the meltblown fibers within the matrix ("bonding" fibers means adhering the fibers together firmly, so they generally do not separate when the web is subjected to normal handling). Conventional bonding techniques using heat and pressure applied in a point-bonding process or by smooth calender rolls can be used, though such processes may cause undesired deformation of fibers or compaction of the web. A more preferred technique for bonding the meltspun fibers is taught in a patent application being filed the same day as the present application, Attorney's Docket No. 60632US003, incorporated herein by reference. Apparatus for performing this technique is illustrated in FIGS. 1, 5 and 6 of the drawings. In brief summary, as applied to the present invention, this preferred technique involves subjecting the collected web of meltspun and meltblown fibers to a controlled heating and quenching operation that includes a) forcefully passing through the web a gaseous stream heated to a temperature sufficient to soften the meltspun fibers sufficiently to cause the meltspun fibers to bond together at points of fiber intersection (e.g., at sufficient points of intersection to form a coherent or bonded matrix), the heated stream being applied for a discrete time too short to wholly melt the fibers, and b) immediately forcefully passing through the web a gaseous stream at a temperature at least 50° C. less than the heated stream to quench the fibers ("immediately" means as part of the same operation, i.e., without an intervening time of storage as occurs when a web is wound into a roll before the next processing step). As a shorthand term this technique is described as the quenched flow heating technique, and the apparatus as a quenched flow heater.

It has been found that the meltblown microfibers do not substantially melt or lose their fiber structure during the bonding operation, but remain as discrete microfibers with their original fiber dimensions. Meltblown fibers are known to have a different, less crystalline morphology than meltspun fibers, and we theorize that the limited heat applied to the web during the bonding operation is exhausted in developing crystalline growth within the meltblown fibers before melting of the meltblown fibers occurs. Whether this theory is correct or not, bonding of the meltspun fibers without substantial melting or distortion of the meltblown microfibers does occur and is beneficial to the properties of the finished web.

A variation of the described method, taught in more detail in the aforementioned Docket No. 60632US003 patent application, takes advantage of the presence of two different kinds of molecular phases within meltspun fibers—one kind called crystallite-characterized molecular phases because of a relatively large presence of chain-extended, or strain-induced, crystalline domains, and a second kind called amorphous-characterized phases because of a relatively large presence of domains of lower crystalline order (i.e., not chain-extended) and domains that are amorphous, though the latter may have some order or orientation of a degree insufficient for crystallinity. These two different kinds of phases, which need not have sharp boundaries and can exist in mixture with one another, have different kinds of properties, including different melting and/or softening characteristics: the first phase characterized by a larger presence of chain-extended crystalline domains melts at a temperature (e.g., the melting point of the chain-extended crystalline domain) that is higher than the temperature at which the second phase melts or softens (e.g., the glass transition temperature of the amorphous domain as modified by the melting points of the lower-order crystalline domains).

In the stated variation of the described method, heating is at a temperature and for a time sufficient for the amorphous-characterized phase of the fibers to melt or soften while the crystallite-characterized phase remains unmelted. Generally, the heated gaseous stream is at a temperature greater than the onset melting temperature of the polymeric material of the fibers. Following heating, the web is rapidly quenched as discussed above.

Treatment of the collected web at such a temperature is found to cause the meltspun fibers to become morphologically refined, which is understood as follows (we do not wish to be bound by statements herein of our "understanding," which generally involve some theoretical considerations). As to the amorphous-characterized phase, the amount of molecular material of the phase susceptible to undesirable (softening-impeding) crystal growth is not as great as it was before treatment. The amorphous-characterized phase is understood to have experienced a kind of cleansing or reduction of molecular structure that would lead to undesirable increases in crystallinity in conventional untreated fibers during a thermal bonding operation. Treated fibers of the invention are capable of a kind of "repeatable softening," meaning that the fibers, and particularly the amorphous-characterized phase of the fibers, will undergo to some degree a repeated cycle of softening and resolidifying as the fibers are exposed to a cycle of raised and lowered temperature within a temperature region lower than that which would cause melting of the whole fiber.

In practical terms, repeatable softening is indicated when a treated web (which already generally exhibits a useful bonding as a result of the heating and quenching treatment) can be heated to cause further autogenous bonding of the fibers. The cycling of softening and resolidifying may not continue indefinitely, but it is generally sufficient that the fibers may be initially bonded by exposure to heat, e.g., during a heat treatment according to the invention, and later heated again to cause re-softening and further bonding, or, if desired, other operations, such as calendering or re-shaping. For example, a web of the invention may be calendered to a smooth surface or given a nonplanar shape, e.g., molded into a face mask, taking advantage of the improved bonding capability of the fibers (though in such cases the bonding is not limited to autogenous bonding).

While the amorphous-characterized, or bonding, phase has the described softening role during web-bonding, calendering, shaping or other like operation, the crystallite-characterized phase of the fiber also has an important role, namely to reinforce the basic fiber structure of the fibers. The crystallite-characterized phase generally can remain unmelted during a bonding or like operation because its melting point is higher than the melting/softening point of the amorphous-characterized phase, and it thus remains as an intact matrix that extends throughout the fiber and supports the fiber structure and fiber dimensions. Thus, although heating the web in an autogenous bonding operation will cause fibers to weld together by undergoing some flow and coalescence at points of fiber intersection, the basic discrete fiber structure is substantially retained over the length of the fibers between intersections and bonds; preferably, the cross-section of the fibers remains unchanged over the length of the fibers between intersections or bonds formed during the operation. Similarly, although calendering of a web of the invention may cause fibers to be reconfigured by the pressure and heat of the calendering operation (thereby causing the fibers to permanently retain the shape pressed upon them during calendering and make the web more uniform in thickness), the fibers generally remain as discrete fibers with a consequent retention of desired web porosity, filtration, and insulating properties.

As shown in FIGS. 1, 5 and 6, in a preferred method of carrying out the invention, the mass 20 of collected meltspun and meltblown fibers is carried by the moving collector 19 under a controlled-heating device 200 mounted above the collector 19. The exemplary heating device 200 comprises a housing 201 which is divided into an upper plenum 202 and a lower plenum 203. The upper and lower plenums are separated by a plate 204 perforated with a series of holes 205 that are typically uniform in size and spacing. A gas, typically air, is fed into the upper plenum 202 through openings 206 from conduits 207, and the plate 204 functions as a flow-distribution means to cause air fed into the upper plenum to be rather uniformly distributed when passed through the plate into the lower plenum 203. Other useful flow-distribution means include fins, baffles, manifolds, air dams, screens or sintered plates, i.e., devices that even the distribution of air.

In the illustrative heating device 200 the bottom wall 208 of the lower plenum 203 is formed with an elongated slot 209 through which an elongated or knife-like stream 210 of heated air from the lower plenum is blown onto the mass 20 traveling on the collector 19 below the heating device 200 (the mass 20 and collector 19 are shown partly broken away in FIG. 6). The air-exhaust device 14 preferably extends sufficiently to lie under the slot 209 of the heating device 200 (as well as extending downweb a distance 218 beyond the heated stream 210 and through an area marked 220, as will be discussed below). Heated air in the plenum is thus under an internal pressure within the plenum 203, and at the slot 209 it is further under the exhaust vacuum of the air-exhaust device 14. To further control the exhaust force a perforated plate 211 may be positioned under the collector 19 to impose a kind of back pressure or flow-restriction means that assures the stream 210 of heated air will spread to a desired extent over the width or heated area of the collected mass 20 and be inhibited in streaming through possible lower-density portions of the collected mass. Other useful flow-restriction means include screens or sintered plates.

The number, size and density of openings in the plate 211 may be varied in different areas to achieve desired control. Large amounts of air pass through the fiber-forming apparatus and must be disposed of as the fibers reach the collector in the region 215. Sufficient air passes through the web and collector in the region 216 to hold the web in place under the various streams of processing air. And sufficient openness is needed in the plate under the heat-treating region 217 to allow treating air to pass through the web, while sufficient resistance is provided to assure that the air is evenly distributed.

The temperature-time conditions should be controlled over the whole heated area of the mass. We have obtained best results when the temperature of the stream 210 of heated air passing through the web is within a range of 5° C., and preferably within 2 or even 1° C., across the width of the mass being treated (the temperature of the heated air is often measured for convenient control of the operation at the entry point for the heated air into the housing 201, but it also can be measured adjacent the collected web with thermocouples). In addition, the heating apparatus is operated to maintain a steady temperature in the stream over time, e.g., by rapidly cycling the heater on and off to avoid over- or under-heating. Preferably the temperature is held within one degree Centigrade of the intended temperature when measured at one second intervals.

To further control heating, the mass is subjected to quenching quickly after the application of the stream 210 of heated air. Such a quenching can generally be obtained by drawing ambient air over and through the mass 20 immediately after the mass leaves the controlled hot air stream 210. Numeral 220 in FIG. 5 represents an area in which ambient air is drawn through the web by the air-exhaust device after the web has passed through the hot air stream. Actually, such air can be drawn under the base of the housing 201, e.g., in the area 220a marked on FIG. 5 of the drawings, so that it reaches the web almost immediately after the web leaves the hot air stream 210. And the air-exhaust device 14 extends along the collector for a distance 218 beyond the heating device 100 to assure thorough cooling and quenching of the whole mass 20. For shorthand purposes the combined heating and quenching apparatus is termed a quenched flow heater.

One aim of the quenching is to withdraw heat before undesired changes occur in the microfibers contained in the web. Another aim of the quenching is to rapidly remove heat from the web and the fibers and thereby limit the extent and nature of crystallization or molecular ordering that will subsequently occur in the fibers. By rapid quenching from the molten/softened state to a solidified state, the amorphous-characterized phase is understood to be frozen into a more purified crystalline form, with reduced molecular material that can interfere with softening, or repeatable softening, of the fibers. For some purposes, quenching may not be absolutely required though it is strongly preferred for most purposes.

To achieve quenching the mass is desirably cooled by a gas at a temperature at least 50° C. less than the nominal melting point; also the quenching gas is desirably applied for a time on the order of at least one second (the nominal melting point is often stated by a polymer supplier; it can also be identified with differential scanning calorimetry, and for purposes herein, the "Nominal Melting Point" for a polymer is defined as the peak maximum of a second-heat, total-heat-flow DSC plot in the melting region of a polymer if there is only one maximum in that region; and, if there are more than one maximum indicating more than one melting point (e.g., because of the presence of two distinct crystalline phases), as the temperature at which the highest-amplitude melting peak occurs). In any event the quenching gas or other fluid has sufficient heat capacity to rapidly solidify the fibers.

An advantage of the invention is that the meltblown microfibers held within a web of the invention are better protected against compaction than they would be if present in an all-microfiber layer. The meltspun fibers are generally larger, stiffer and stronger than the meltblown microfibers, and they can be made from material different from that of the microfibers. The presence of the meltspun fibers between the meltblown microfibers and an object applying pressure limits application of crushing force on the microfibers. Especially in the case of submicron fibers, which can be quite fragile, the increased resistance against compaction or crushing provided by the invention offers an important benefit. Even when webs of the invention are subjected to pressure, e.g., by being rolled up in jumbo storage rolls or in secondary processing, webs of the invention offer good resistance to compaction of the web, which could otherwise lead to increased pressure drop and poor loading performance for filters. A compaction test is described and used in some of the examples to illustrate the resistance to compaction exhibited by webs of the invention. The presence of the meltspun fibers also adds other properties such as web strength, stiffness and handling properties.

The diameters of the fibers can be tailored to provide needed filtration and other properties. For example it may be desirable for the meltspun fibers to have a median diameter of 5 to 40 micrometers and the meltblown fibers to have a median diameter of 0.5 to 10 micrometers. Preferably the meltspun fibers have a median diameter between 10 and 30 micrometers, whereas the microfibers preferably have a median diameter of 5 micrometers or less. As previously stated, the invention is particularly useful to incorporate very small microfibers, including ultrafine fibers having a median diameter of 2 micrometers or less or submicron fibers having a median diameter of one micrometer or less. Also, it is possible to form a gradient through the web, e.g., in the proportion of meltblown over the height or thickness of the web, which may be achieved by varying process conditions such as the air velocity or mass rate of the meltblown stream or the geometry of the intersection of the meltspun and meltblown streams, including the distance of the meltblowing die from the meltspun stream and the angle of the meltblown stream. A concentration of meltblown fibers near one edge of a web is common.

As shown in phantom lines in FIG. 1, a second stream 100a of meltblown fibers optionally can be introduced into the stream of oriented continuous fibers. Further streams can also be included.

The invention is most commonly practiced by collecting a web on a continuous screen-type collector such as the belt-type collector 19 in FIG. 1 or a screen-covered drum. In a different collection method a web can be collected by aiming the merged stream of meltspun and meltblown fibers into the gap between two collectors, as shown and described in Olson et al., WO 2004/046443, whereupon a web having a C-shaped configuration of fibers is obtained.

If a web could be prepared from the submicron fibers themselves, such a web would be flimsy and weak. But by incorporating the submicron fibers in a coherent bonded oriented fiber matrix a strong and self-supporting web or sheet material can be obtained. Preferably webs of the invention have a Gurley stiffness of at least 200 mg, especially when intended to be used in devices such as pleated filters.

Various procedures are available for electrically charging a nonwoven fibrous web to enhance its filtration capacity: see Angadjivand, U.S. Pat. No. 5,496,507.

In preparing meltspun fibers or meltblown fibers, different fiber-forming materials may be extruded through different orifices of the meltspinning extrusion head or meltblowing die so as to prepare webs that comprise a mixture of fibers.

EXAMPLES

Examples 1-4

Four sample webs of the invention were prepared on apparatus as shown in FIG. 1 from polypropylene meltspun fibers and polypropylene meltblown microfibers. The meltspun fibers were prepared from polypropylene having a melt flow index of 70 (Fina 3860), to which was added 0.75 wt. % of a hindered-amine light stabilizer (CAS No. 71878-19-8; Chimassorb 944, supplied by Ciba Specialty Chemicals). The extrusion head 10 had 16 rows of orifices, with 32 orifices in a row, making a total of 512 orifices; orifices were arranged in a square pattern (meaning that orifices were in alignment transversely as well as longitudinally, and equally spaced both transversely and longitudinally) with 0.25 inch (6.4 mm) spacing. The polymer was fed at different rates, listed in Table 1 below, to the extrusion head 10, and there heated to a temperature of 235 degrees C.

Two quenching streams having flow as illustrated at 18b in FIG. 1 were used (no quenching stream as illustrated by 18a was used). A first, upper, quenching air stream was supplied from quench boxes 16 inches (406 mm) in height at an approximate face velocity of 83 fpm (0.42 m/s) for Examples 1-3 and 93 fpm (0.47 m/s) for Example 4. in addition, a second, lower, quenching air stream following the first quenching stream was supplied from quench boxes 7.75 inches (197 mm) in height at an approximate face velocity of 31 fpm (0.16 m/s) for Examples 1-3 and 43 fpm (0.22 m/s) for Example 4. Air to the upper quench boxes was supplied at a temperature of 45 degrees F. (7.2 degrees C.), while air to the lower quench boxes was supplied at ambient room temperature.

The air knife gap (30 in FIG. 2) was 0.030 inch (0.76 mm) and air was fed to the air knife at a pressure of 14 psig (0.97 bar gauge). The top gap of the attenuator (33 in FIG. 2) was 0.20 inch (5.1 mm), the bottom gap was 0.185 inch (4.7 mm), and the walls (36 in FIG. 2) were 6 inches (152 mm) long. The distance 17 from the extrusion head 10 to the attenuator 16 was 31 inches (78.7 centimeters), and the distance 21 from the attenuator to the collection belt 19 was 27 inches (68.6 centimeters).

The meltspun fibers of Example 4 were measured with scanning electron microscopy (SEM) and found to have a median diameter (44 fibers measured) of 15 micrometers. The meltspun fibers of Examples 1-3 were estimated to have a median fiber diameter of approximately 11 micrometers (based on similar samples). The meltspun fiber stream deposited on the collection belt at a width of about 14 inches (about 36 centimeters).

For the meltblown fibers, polypropylene having a melt flow index of 350 (Fina 3960) and containing 0.75 wt. % Chimassorb 944 was fed into a drilled-orifice meltblowing die 102 having a 10-inch-wide (254 mm) nosetip, with twenty-five 0.015-inch-diameter (0.38 mm) orifices per inch (one orifice per mm) at a rate of 10 pounds per hour (4.54 kilograms per hour). The die temperature was 325 degrees C. and the temperature of the primary air stream was 740 degrees F. (393 degrees C.); the flow of air in the primary air stream was estimated to be about 250 scfm (7.1 standard $m^3$ per minute metric). The relationship of the meltblowing die to the spunbond fiber stream 1 was as follows: the distance 107 was 4 inches (about 10 centimeters); the distance 108 was 8.5 inches (about 22 centimeters); the distance 109 was 19 inches (about 48 centimeters); and the angle theta was 20 degrees.

The meltblown fibers were measured with SEM and found to have a median fiber diameter of 1.13 micrometers, and the meltblown fiber stream had a width such as to be present at a width of about 12 inches (about 30 centimeters) in the collected web on the collection belt 19. Essentially 100% of the meltblown fibers were captured within the meltspun stream. The web of one example (Example 4) was cross-sectioned and microfibers were found to be distributed through the full thickness of the web. At the polymer flow rates reported in Table 1, the webs of Examples 1-3 had a ratio of about 64 parts by weight of meltspun fibers and 36 parts by weight meltblown fibers. The web of Example 4 had a ratio of about 82 parts by weight of meltspun fibers and 18 parts by weight meltblown fibers.

The combined stream of meltspun and meltblown fibers was collected on a 20-mesh stainless steel collection belt (19), which moved at a rate of 29 fpm (about 8.8 meters/minute) for Examples 1-3 and 47 fpm (about 14.3 meters/minute) for Example 4. The vacuum under the collection belt was estimated in the range of 6 to 12 inches $H_2O$ (1500-3000 Pa); and the region 215 of the plate 211 had 0.62-inch-diameter (1.6 mm) openings in a staggered spacing resulting in 23% open area; the web hold-down region 216 had 0.062-inch-diameter (1.6 mm) openings in a staggered spacing resulting in 30% open area; and the heating/bonding region 217 and the quenching region 218 had 0.156-inch-diameter (4.0 mm) openings in a staggered spacing resulting in 63% open area.

Air was supplied through the conduits 207 at a rate sufficient to present 500 cubic feet per minute of air at the slot 209, which was 1.5 inch by 22 inches (3.8 by 55.9 centimeters). The bottom of the plate 208 was ¾ to 1 inch (1.9-2.54 centimeters) from the collected web 20 on the collector. The temperature of the air passing through the slot 209 of the quenched flow heater is given in Table 1 for each example (as measured by open junction thermocouples at the entrance of the conduits 207 to the housing 201).

The web leaving the quenching area 220 was bonded with sufficient integrity to be handled by normal processes and equipment; i.e., the web could be wound by normal windup into a storage roll or could be subjected to various operations such as molding, pleating, or assembly into a use device such as a filter panel. Upon microscopic examination the meltspun fibers were found to be bonded at fiber intersections and the meltblown fibers were found to be substantially unmelted and having limited bonding to the meltspun fibers (which could have developed at least in part during mixing of the meltspun and microfiber streams).

Other web and forming parameters are described in Table 1 (in the table QFH means quenched flow heater and BMF means meltblown microfibers).

TABLE 1

| Example No. | Nominal Basis weight, gsm | QFH temp, °C. | Mspun rate ghm | Mspun rate lb/hr | BMF rate lb/in/hr | BMF rate lb/hr | BMF % mass |
|---|---|---|---|---|---|---|---|
| 1 | 100 | 155 | 0.30 | 20.3 | 1.00 | 10.0 | 36% |
| 2 | 100 | 159 | 0.30 | 20.3 | 1.00 | 10.0 | 36% |
| 3 | 100 | 151 | 0.30 | 20.3 | 1.00 | 10.0 | 36% |
| 4 | 100 | 147 | 0.80 | 54.2 | 1.00 | 10.0 | 18% |

The four collected webs were hydrocharged with deionized water according to the technique taught in Angadjivand, U.S. Pat. No. 5,496,507 and allowed to dry by hanging on a line overnight at ambient conditions, and were then formed into smooth, cup-shaped molded respirators with a heated, hydraulic molding press. The molding conditions for the four samples, including the mold temperature, gap, and dwell time, were varied as described in Table 2 below. The finished respirators had an approximate external surface area of 145 cm$^2$. The webs were molded with the collector side of the web (the side of the web that directly contacted the collector surface during web collection) both up and down, to examine whether fiber intermixing and/or the collection surface affected the loading behavior.

The samples were then load tested as respirators with NaCl on a TSI 8130 Automatic Filter Tester (approximately 0.075 μm diameter particles). Samples were loaded to maximum penetration at 85 lpm flowrate and and the tests were then stopped. The challenge stream comprised particles generated from a 2% NaCl solution in a concentration of 19-25 mg/m$^3$. The automatic filter tester was run with the heater on and particle neutralizer on. Results are given in Table 2. The last column gives the total weight collected on the filter from the challenge stream up to the time of maximum penetration.

As the results show, many of the samples start with pressure drop less than 10 mm H$_2$O and experience maximum penetration <5%, and some of the samples start with pressure drop less than 10 mm H$_2$O and experience maximum penetration <1%. It is also noted that samples F, G, H, I showed moderate variability between replicates; the variability is believed to be due to variability in setting the mold gap during the respirator forming process. One loading test for a standard commercial respirator (of multilayer construction) is listed as a control.

The most preferred samples in Table 2 are the F, H, and S samples. Samples F and H are most preferred because they exhibit penetration and pressure drop loading results very similar to the standard multilayer commercial respirator. Sample S is also a most preferred sample because it is run at significantly higher total process throughput, has low initial pressure drop, and has maximum penetration of less than 5%. Other preferred samples in Table 2 include the A, G, I, and T samples, because they exhibit initial pressure drop of less than 10 mm H$_2$O, maximum penetrations of less than 5%, and moderate NaCl challenge at maximum penetration (meaning that they do not plug up too rapidly).

Examples 5-13

Except as shown in Table 3, samples of webs were prepared in the manner of Example 4, and evaluated for use as self-supporting pleated filtration media (in Table 3 "x position

TABLE 2

| Sample | Input Web | Collector side | Mold temp, °F. | Mold gap, mils | Mold time, sec. | ΔP Initial mm H2O | % Pen Initial | ΔP at Max Pen mm H2O | % Pen Max | Chal'ge Max Pen mg |
|---|---|---|---|---|---|---|---|---|---|---|
| A | 1 | Down | 275 | 20 | 5 | 9.4 | 0.034 | 34.3 | 0.25 | 75.2 |
| B | 1 | Up | 250 | 20 | 10 | 12.0 | 0.075 | 15.6 | 0.08 | 5.1 |
| C | 1 | Up | 250 | 20 | 5 | 11.9 | 0.094 | 17.5 | 0.12 | 7.3 |
| D | 1 | Up | 275 | 20 | 5 | 11.8 | 0.117 | 15.7 | 0.13 | 4.7 |
| E | 1 | Up | 275 | 20 | 5 | 10.8 | 0.097 | 13.8 | 0.10 | 4.8 |
| F | 2 | Down | 275 | 20 | 5 | 5.9 | 0.066 | 9.6 | 0.29 | 91.8 |
| G | 2 | Down | 275 | 20 | 5 | 7.9 | 0.295 | 13.9 | 1.06 | 25.7 |
| H | 2 | Down | 275 | 20 | 5 | 5.1 | 0.092 | 7.2 | 0.16 | 63.0 |
| I | 2 | Down | 275 | 20 | 5 | 8.4 | 0.150 | 15.5 | 0.62 | 26.8 |
| J | 2 | Up | 250 | 20 | 5 | 8.5 | 0.226 | 12.3 | 0.34 | 6.6 |
| K | 2 | Up | 250 | 20 | 5 | 9.2 | 0.305 | 13.8 | 0.44 | 6.6 |
| L | 2 | Up | 275 | 20 | 5 | 9.7 | 0.723 | 12.8 | 0.81 | 4.4 |
| M | 2 | Up | 275 | 20 | 5 | 9.1 | 0.515 | 12.8 | 0.55 | 6.6 |
| N | 3 | Down | 275 | 20 | 5 | 11.9 | 0.065 | 21.7 | 0.17 | 28.1 |
| O | 3 | Up | 250 | 20 | 10 | 13.8 | 0.048 | 16.2 | 0.06 | 2.9 |
| P | 3 | Up | 250 | 20 | 5 | 12.0 | 0.177 | 15.1 | 0.19 | 4.4 |
| Q | 3 | Up | 275 | 20 | 5 | 15.1 | 0.113 | 15.1 | 0.11 | — |
| R | 3 | Up | 275 | 20 | 5 | 13.4 | 0.095 | 17.6 | 0.10 | 5.0 |
| S | 4 | Down | 275 | 20 | 5 | 4.2 | 0.520 | 9.0 | 4.45 | 41.9 |
| T | 4 | Up | 275 | 20 | 5 | 4.3 | 0.699 | 9.4 | 1.73 | 17.4 |
| U | Commercial Respirator | | | | | 6.3 | 0.104 | 8.5 | 0.43 | 167.5 | means the distance 107 on FIG. 4 of the drawings). Samples were also hydrocharged in the manner described in Examples 1-4. A critical parameter in determining if a filter web is suitable for use as a self-supporting pleated filter is the stiffness of the web; adequate stiffness is necessary to initially form and later retain the pleated shape. In describing a filter as "self-supporting," the filter media property is being described and not the filter property, i.e. that the media itself is not reinforced by wire, mesh, or stiffening layers even if the filter construction may have wire, glue, or frame reinforcement to strengthen the entire filter.

A Gurley stiffness of greater than 200 mg is typically required for a 0.5-1.0 inch (12-25 mm) pleat height (common for residential HVAC, room air purifiers, cabin air filtration, etc.), and a Gurley stiffness of greater than 600 mg is typically required for a 2-6 inch (50-150 mm) pleat height (common for commercial HVAC and residential "deep" furnace filters). (Gurley Stiffness is measured with a Gurley Bending Resistance Tester Model 4171E. Samples are prepared by die-cutting 1.5×2.0 inch rectangles from a web. Samples are cut with the long side running in the cross direction of the web. Samples are then loaded into the testing machine with the long side in the web holding clamp. The web is flexed in both directions, i.e. with the test arm pressed against the first face and then against the second face, and the machine reports the average stiffness of the two measurements in milligrams. The test is treated as a destructive test.)

The exemplary webs of the invention were compared to the flat web properties of a commercially available HVAC filter, namely a 2-inch-deep (50 mm) pleated filter with 5 mm pleat spacing, the filter media being a three-layer laminate including a 17 gsm polypropylene spunbond coverweb, a 40 gsm electrostatically charged meltblown filter media, and a 90 gsm polyester spunbond stiffening layer. The web used to make the commercial pleated filter was tested in the flat condition before folding into a pleated form.

The key targeted properties of the exemplary webs of the invention include a Gurley stiffness of greater than 600 mg (to achieve the stated two-inch pleat depth of the commercial filter) and similar penetration (efficiency) as the commercial filter. The samples were tested for initial pressure drop and penetration properties with dioctyl phthalate (DOP, approximately 0.185 μm diameter) on a TSI 8130 Automatic Filter Tester. Particles were generated at a concentration of approximately 100 mg/m³. The automatic filter tester was run with the heater off and particle neutralizer off. Quality factor is defined as Q=−ln(% pen/100)/ΔP. Results are given in Table 4.

TABLE 4

| Sample | ΔP at 85 lpm, mm H2O | % Pen DOP at 85 lpm | Quality factor | Gurley stiffness, mg |
|---|---|---|---|---|
| 5 | 3.58 | 12.6 | 0.58 | 784 |
| 6 | 5.00 | 4.34 | 0.63 | 369 |
| 7 | 4.28 | 6.72 | 0.63 | 387 |
| 8 | 4.56 | 7.36 | 0.57 | 862 |
| 9 | 2.56 | 14.5 | 0.75 | 392 |
| 10 | 2.92 | 17.4 | 0.60 | 559 |
| 11 | 3.40 | 9.10 | 0.70 | 414 |
| 12 | 2.08 | 24.1 | 0.68 | 622 |
| 13 | 3.44 | 10.6 | 0.65 | 432 |
| Commercial Laminate | 2.77 | 14.8 | 0.69 | N/A |

Three samples (5, 8, 12) exhibited the necessary stiffness and bracketed the penetration of the commercial sample. Additionally, several of the other samples showed sufficient penetration and pressure drop, but with stiffness that was slightly low. It is noted that higher stiffness is commonly achieved via higher web weight, and a difference of even 10 gsm can make a great improvement in stiffness. The collective samples clearly show that with optimization the commercial sample could be easily replicated. Examples 5-13 are all about 100 gsm, which is considerably less than the current commercial [multilayer product] laminate solution of approximately 150 gsm.

Further evaluation was performed by load-testing Examples 5-13 as flat filters with NaCl on a TSI 8130 Automatic Filter Tester (approximately 0.075 μm diameter particles). As with the molded respirators, the flat media was tested with the collector side of the web both up and down to examine whether fiber intermixing and/or the collection surface affected the loading behavior. Samples were loaded to maximum penetration at 60 lpm (10 cm/s face velocity) flow-rate, and the tests were then stopped. Particles were generated from a 2% NaCl solution in a concentration of about 16-23 mg/m³. The automatic filter tester was run with the heater on and particle neutralizer on. Results are in Table 5.

It was noted that samples exhibited maximum penetrations as low as 6% penetration NaCl (as the filter web was tested, penetration gradually increased until reaching a maximum, whereupon penetration decreased because of the filtering effect of the collected challenge on the filter). Samples Example 9 and 10 webs tested "down" are the most preferred samples because they have initial pressure drop closest to the comparison, lower initial penetration, higher initial quality factor, and lower maximum penetration, all with similar pressure drop rise as a function of challenge. The Example 12 web is also a most preferred sample because it has slightly lower

TABLE 3

| Sample | Basis weight, gsm | QFH Temp, °C. | BMF Die x-position, in. | Meltspun rate, ghm | Meltblown rate, lb/in/hr | Meltblown % mass |
|---|---|---|---|---|---|---|
| 5 | 100 | 155 | 8 | 0.80 | 1.00 | 18% |
| 6 | 100 | 147 | 4 | 0.80 | 1.00 | 18% |
| 7 | 100 | 147 | 8 | 0.80 | 1.00 | 18% |
| 8 | 100 | 155 | 4 | 0.80 | 1.00 | 18% |
| 9 | 100 | 147 | 8 | 0.80 | 0.50 | 10% |
| 10 | 100 | 155 | 4 | 0.80 | 0.50 | 10% |
| 11 | 100 | 147 | 4 | 0.80 | 0.50 | 10% |
| 12 | 100 | 155 | 8 | 0.80 | 0.50 | 10% |
| 13 | 100 | 151 | 6 | 0.80 | 0.75 | 14% | initial pressure drop, somewhat higher maximum penetration, but almost 3× the mass challenge at maximum penetration for nearly equal pressure drop rise—equating to a better-loading filter. The hydrocharged Samples 9 and 11 tested "up" and Samples 5, 8, 11, and 13 tested "down" are also preferred samples because they have moderate pressure drop, low initial penetration, moderate to high initial quality factors, and maximum penetration less than the control.

1-13 illustrate that the present invention can be tuned and used for numerous pleated filter applications, including but not limited to low to high MERV ratings for HVAC filter applications, room air purifier filters, cabin air filters, automotive intake filters, and many general or specific pleated filter uses.

Samples were also tested for resistance to compaction. Compaction is important because webs are subjected to pressure when rolled up in long rolls and in secondary processing,

TABLE 5

| Sample | Collector side | ΔP at 60 lpm inital, mm H2O | % pen NaCl initial | Initial quality factor | ΔP at 60 lpm max pen, mm H2O | % pen NaCl maximum | Challenge at max pen, mg |
|---|---|---|---|---|---|---|---|
| 9 | Up | 2 | 3.82 | 1.63 | 7.1 | 32.7 | 35.9 |
| 11 | Up | 2.9 | 2.13 | 1.33 | 8.4 | 10.7 | 18.1 |
| 5 | Down | 2.7 | 2.45 | 1.37 | 7.2 | 22.8 | 26.7 |
| 6 | Down | 4.4 | 0.456 | 1.23 | 11.1 | 6.49 | 28.3 |
| 7 | Down | 3.7 | 0.957 | 1.26 | 9.6 | 10.5 | 26.9 |
| 8 | Down | 3.2 | 1.32 | 1.35 | 9 | 15.6 | 62.1 |
| 9 | Down | 1.9 | 4.61 | 1.62 | 5.5 | 31.9 | 35.1 |
| 10 | Down | 2.3 | 4.39 | 1.36 | 5.9 | 30 | 24.2 |
| 11 | Down | 2.8 | 1.91 | 1.41 | 7.7 | 16.2 | 29.5 |
| 12 | Down | 1.8 | 9.38 | 1.31 | 4.5 | 45.9 | 62.4 |
| 13 | Down | 2.9 | 2.7 | 1.25 | 7.0 | 18.9 | 21.4 |
| Commercial Laminate | N/A | 1.9 | 9.97 | 1.21 | 4.3 | 39.9 | 22.2 |

In comparing both Table 4 and Table 5, Sample 12 is the overall most preferred sample due to the balance of flat media physical properties and filtration performance.

Figure 7:
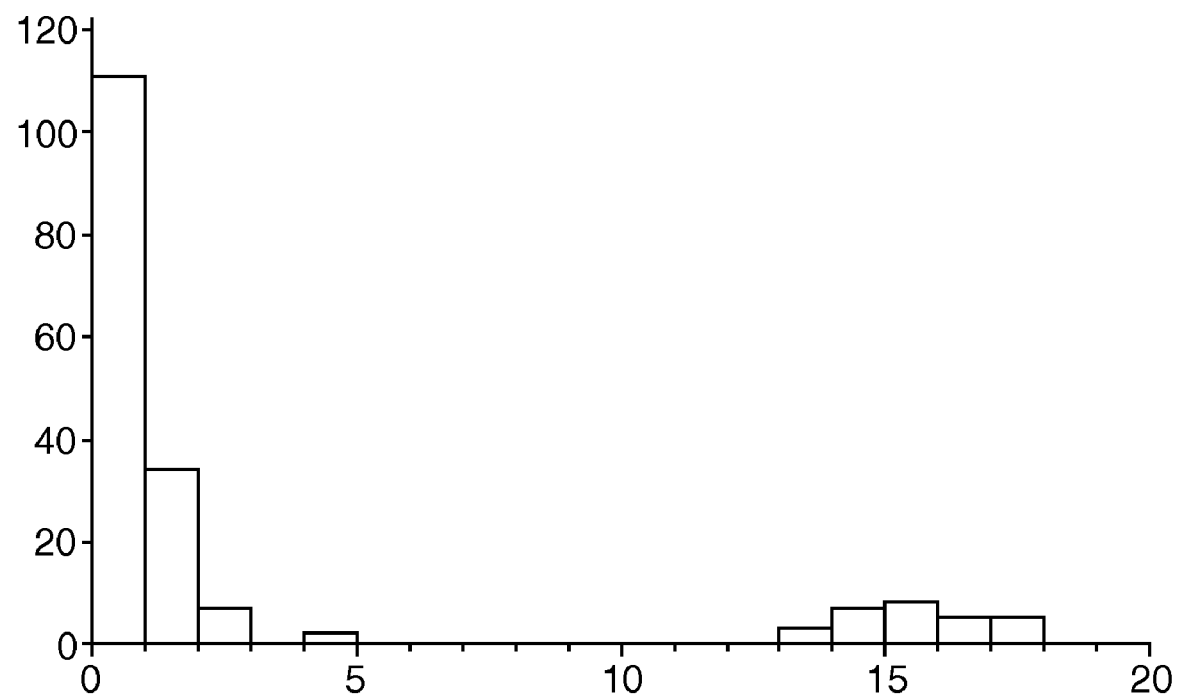
FIG. 7 is a histogram showing the distribution of fibers in a web of Example 11.

Example 11 was submitted for analysis with a scanning electron microscope, and the meltblown fibers were found to have a median diameter of 0.65 micrometers, a mean diameter of 0.88 micrometers, and a standard deviation of 0.67 micrometers; the maximum diameter was 4.86 microns and the minimum was 0.20 micrometers. The sample size was 151 meltblown fibers and 28 meltspun fibers; all fibers less than 10 microns in diameter were assumed to be meltblown fibers. A histogram of the size distribution is pictured in FIG. 7, with fiber diameter in micrometers plotted along the abscissa and frequency plotted along the ordinate. Based on component mass percentages and SEM measurements of the meltblown and meltspun fiber diameters, the surface area of the meltblown microfibers was determined as about 51% of the total web surface area, and the surface area of the submicron fibers was determined as about 23% of the total web surface area.

and compaction of the web can lead to increased pressure drop and poor loading performance for filters.

To run the compaction test, eight 5.25" diameter circles were cut from each web. The circles were measured for initial thickness, and pressure drop at 14 cm/s face velocity. Each set of eight circles was then stacked, and a weight was placed on top of the samples to provide a 1.0 psi (6.9 kPa) pressure on the cross-section of the circle. Each set of 8 circles was tested independently. Weights were removed at 24 and 48 hours, and thickness and pressure drop were measured. Upon completion of the 48-hour test, the percent change in thickness and pressure drop was calculated.

The webs of Examples 4 and 12 were tested, and for comparison a meltblown web (Example C1) was also tested. The meltblown web consisted only of polypropylene fibers having an effective fiber diameter of 5.5 micrometers, the web basis weight was 106 gsm, and the web had a solidity of 5.4%. Results are reported in Table 6, where "t" is time in hours.

TABLE 6

| | | Thickness, mils | | | | Pressure drop, mm H2O | | | |
|---|---|---|---|---|---|---|---|---|---|
| Example | Type | t = 0 | t = 24 | t = 48 | % Δ | t = 0 | t = 24 | t = 48 | % Δ |
| 12 | Composite | 45.2 | 42.5 | 42.0 | −7% | 5.4 | 5.5 | 5.7 | 5% |
| 4 | Composite | 36.8 | 35.8 | 34.5 | −6% | 2.3 | 2.4 | 2.4 | 4% |
| C1 | Meltblown | 86.5 | 63.6 | 59.8 | −31% | 14.4 | 17.3 | 18.0 | 25% |

The submicron fibers of Example 11 were captured with essentially 100% efficiency during the web formation process, and the resulting bonded web had adequate strength and integrity for normal handling.

While a specific construction is compared in these experiments, the deep body of information included in Samples As will be seen webs of the invention had a compaction of less than 10%. Even a compaction of 20% would be markedly better than the compaction exhibited by the meltblown web.

What is claimed is:

1. A nonwoven fibrous web comprising a matrix of continuous meltspun monocomponent fibers autogenously bonded to a coherent self-sustaining form, and separately prepared microfibers dispersed among the meltspun fibers in an amount accounting for at least one weight-percent of the fibers of the web; the web being prepared from separate streams of said meltspun fibers and microfibers merged into one stream and deposited on a collector at least 10 centimeters from the point of joinder of the streams, wherein the microfibers have limited bonding to the meltspun fibers and remain as substantially unmelted discrete microfibers with their original fiber dimensions.

2. A web of claim 1 in which the microfibers have a median diameter of two micrometers or less.

3. A web of claim 1 in which the microfibers have a median diameter of one micrometer or less.

4. A web of claim 1 in which the microfibers comprise meltblown microfibers.

5. A web of claim 1 in which the meltspun fibers and the microfibers comprise the molecularly same polymer.

6. A web of claim 1 in which at least either the meltspun fibers or the microfibers are electrically charged to a state of enhanced filtration capability.

7. A web of claim 1 in which both the meltspun fibers and the microfibers are electrically charged to a state of enhanced filtration capability.

8. A web of claim 1 in which the meltspun fibers are autogenously bonded.

9. A web of claim 1 molded into a nonplanar configuration.

10. A web of claim 9 in which the web is held in the nonplanar configuration by autogenous bonds between meltspun fibers in the web.

11. A web of claim 1 in which the meltspun fibers comprise oriented fibers comprised of a semicrystalline polymeric material.

12. A nonwoven fibrous web comprising a matrix of continuous oriented meltspun monocomponent fibers autogenously bonded to a coherent self-sustaining form, and separately prepared meltblown microfibers having a median diameter of 10 micrometers or less dispersed among the meltspun fibers in an amount accounting for at least one weight-percent of the fibers of the web, wherein the microfibers have limited bonding to the meltspun fibers and remain as substantially unmelted discrete microfibers with their original fiber dimensions; the web being prepared from separate streams of said meltspun fibers and microfibers merged into one stream and deposited on a collector at least 10 centimeters from the point of joinder of the streams.

13. A web of claim 12 molded into a nonplanar configuration.

14. A nonwoven fibrous web comprising continuous oriented meltspun monocomponent fibers that form a coherent autogenously bonded web matrix, and a separately prepared batch of microfibers having a median diameter of about 2 micrometers or less dispersed within the matrix in an amount sufficient to provide at least 5 percent of the fibrous surface area of the web, wherein the microfibers have limited bonding to the meltspun fibers and remain as substantially unmelted discrete microfibers with their original fiber dimensions; the web being prepared from separate streams of said meltspun fibers and microfibers merged into one stream and deposited on a collector at least 10 centimeters from the point of joinder of the streams.

15. A web of claim 14 in which the microfibers provide at least 20 percent of the fibrous surface area of the web.

16. A web of claim 14 in which the batch of microfibers has a median diameter of one micrometer or less.

17. A web of claim 14 in which the microfibers comprise meltblown fibers.

18. A web of claim 14 in which the meltspun fibers are autogenously bonded.

19. A web of claim 14 having a Gurley stiffness of at least 200 mg.

20. A web of claim 14 having a compaction of no more than 20% in the compaction test stated herein.

21. A web of claim 14 having a compaction of no more than 10% in the compaction test stated herein.

\* \* \* \* \*

UNITED STATES PATENT AND TRADEMARK OFFICE
CERTIFICATE OF CORRECTION

PATENT NO.        : 7,807,591 B2                                               Page 1 of 1
APPLICATION NO.   : 11/461192
DATED             : October 5, 2010
INVENTOR(S)       : Andrew R. Fox It is certified that error appears in the above-identified patent and that said Letters Patent is hereby corrected as shown below:

Column 1
Line 21, after "web" insert --(see paragraphs [0009] through [0012])--

Column 14
Line 40, delete "0.62-inch-diameter" and insert --0.062-inch-diameter--

Signed and Sealed this
Twelfth Day of April, 2011

David J. Kappos
*Director of the United States Patent and Trademark Office*